United States Patent [19]

Whitworth

[11] Patent Number: 4,842,023
[45] Date of Patent: Jun. 27, 1989

[54] FLEXIBLE HOSE

[75] Inventor: Barrie F. Whitworth, Brighouse, United Kingdom

[73] Assignee: Standard Hose Limited, Brighouse, United Kingdom

[21] Appl. No.: 154,362

[22] Filed: Feb. 10, 1988

[51] Int. Cl.[4] .................. F16L 11/11; F16L 11/12
[52] U.S. Cl. ........................ 138/122; 138/134; 138/135; 138/173
[58] Field of Search ............ 138/134, 121, 122, 129, 138/135, 127, 172, DIG. 8, 118, 120, 173

[56] References Cited

U.S. PATENT DOCUMENTS

| | | | |
|---|---|---|---|
| 1,637,141 | 7/1927 | Cooper | 138/135 |
| 2,886,066 | 5/1959 | Hansen | 138/118 |
| 3,162,214 | 12/1964 | Bazinet | 138/120 |
| 3,957,084 | 5/1976 | Jung | 138/122 |
| 4,326,561 | 4/1982 | Kutnyak | 138/122 |
| 4,669,757 | 6/1987 | Bartholomew | 138/DIG. 8 |
| 4,683,917 | 8/1987 | Bartholomew | 138/DIG. 8 |

FOREIGN PATENT DOCUMENTS

| | | | |
|---|---|---|---|
| 0143659 | 5/1985 | European Pat. Off. | 138/134 |
| 1543586 | 4/1979 | United Kingdom | 138/122 |
| 2057779 | 4/1981 | United Kingdom | 138/122 |

Primary Examiner—James E. Bryant, III
Attorney, Agent, or Firm—Henry Sternberg; Bert J. Lewen

[57] ABSTRACT

A flexible hose comprises a flexible helically convoluted plastics material tube 12 wound helically with a reinforcing profile strip 14. The strip 14 is of such a cross-section as to support the tube wall and limit the maximum radius of curvature R2 at maximum flexion to a value less than that which is obtain with an equivalent standard hose FIG. 5). Preferably the profiled strip has a cross-section which is non-circular and comprises two components, one 18 being substantially axially of the tube, and the other 20 being substantially radially of the tube. The axial component provides support for the tube wall and the radial component serves to improve resistance to radial forces and limits the radius of curvature of the adjacent convolution.

13 Claims, 2 Drawing Sheets

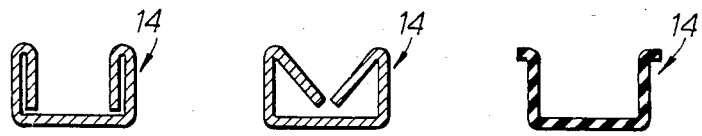
Fig. 4(a).  Fig. 4(b).  Fig. 4(c).
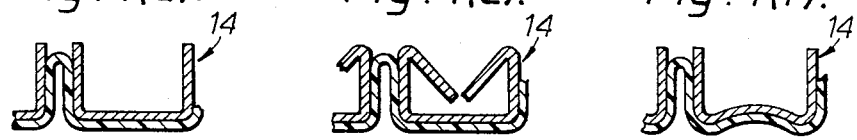
Fig. 4(d).  Fig. 4(e).  Fig. 4(f).
Fig. 4(g).  Fig. 4(h).
Fig. 4(i).  Fig. 4(j).
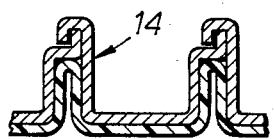
Fig. 4(k).

FLEXIBLE HOSE

This invention relates to flexible hose pipes and in particular relates to flexible helically convoluted thin walled plastics material hoses having improved mechanical properties.

Many attempts have been made to improve the pressure rating of convoluted plastics material, for example polytetrafluoroethylene, tubing. The primary problem with thin walled convoluted plastics material tubing is the ease with which the material under stress can be damaged or stressed locally beyond its elastic limit. This is due to the nature of the convolution shape and to the design of external reinforcing materials and/or layers. Many solutions to the problem have been proposed but all with limited success in that even where the desired properties are improved sacrifices are made to other attributes desirable in the flexible hose.

UK Pat. No. 1,543,586 discloses a method of reinforcing a convoluted plastics material tube with a round wire helix in the external convolutions. While this produces a perfectly satisfactory hose pipe for moderate pressure use, under high pressure the tube tends to deform to fill the space between adjacent convolutions beneath externally applied braiding, leading to excessive local stresses. Thicking the tube wall to prevent this, or reducing the pitch between adjacent convolutions, improves pressure resistance but at the expense of increased material cost and weight, and lower flexibility.

Other proposals using very shallow convolutions and reinforcing the outside surface with, for example, a layer of glass fibre. The latter construction suffers from the disadvantage of poor vacuum resistance and poor resistance to kinking when flexed. Another proposal is to convolute a plastics tube within a thin metal tube giving total support to a plastics material. This method suffers from the disadvantage of requiring expensive manufacturing techniques and difficulties in attaching end fittings when welding can destroy the plastics material adjacent to the end fitting.

The invention seeks to provide a construction of helically convoluted plastics material hose having improved pressure capability while avoiding the disadvantages discussed above.

According to the present invention there is provided a flexible hose which comprises a flexible helically convoluted plastics material tube wound helically with a reinforcing profiled strip characterised in that the profiled strip is of such a cross-section as to support the tube wall and limit the maximum radius of curvature at maximum flexion of any portion of the tube wall to a value less than that which is obtained with an equivalent standard hose as herein defined.

An equivalent standard hose is defined as a wire reinforced helically convoluted hose of the same plastics material constructed in accordance with UK-A-No. 1,543,586 of the same thickness, with equal cross-sectional area of round wire reinforcement, and the same overall weight per unit length. Preferably the hose of the invention limits the maximum radius of curvature to a half or less than that of the equivalent standard hose.

This may be achieved by using a profiled strip which has a cross section which is non-circular and comprises two components, one being substantially axially of the tube and the other being substantially radially of the tube, the axial component providing support for the tube wall and the radial component serving to improve resistance to radial forces by limiting the radius of curvature of the adjacent convolutions.

Preferably, the profiled strip is not "solid" in cross-section and may have a channel section with the base of the channel forming the axial component and the walls of the channel each forming radial components. The axial component of the profiled strip would be as large as possible consistant with maintaining hose flexibility so as to reduce the area of unsupported hose between adjacent helical windings of the profiled strip. The radial component, or components, of the profiled strip support the side walls of the convolution and impart mechanical strength in the radial direction giving internal pressure and external crush resisting properties to the hose.

It should be pointed out that in order to retain the properties, in particular flexibility, of the hose the profiled strip normally will not form part of the flexible tube nor is it adhered thereto, but is free to move with respect to the tube. In certain circumstances, however, it may be desirable to adhere the strip to the tube, e.g. with plasticised PVC tubes to increase vacuum resistance. The hoses to which the invention relates are helically convoluted plastics material hoses, that is hollow tubes which have been formed with helical contours on their outside surfaces and corresponding helical contours on their inside surfaces such that the tube wall will appear, in longitudinal section, to have a regular undulating wave form such as a sine wave form or square wave form.

The profiled strip may be, for example, of a tough resilient plastics material but is preferably of a metal, such as steel.

The tube of the hose of the invention is preferably made from a relatively rigid plastics material such as polytetrafluoroethylene, polypropylene, polyamide, unplasticised polyvinyl chloride, and the like materials although plastics less rigid in nature such as plasticised polyvinyl chloride may be used on occasion.

The invention is based on the discovery that a convoluted thin walled plastics material tube, for example of polytetrafluoroethylene, having a profiled strip placed into the external helical convolution, with the dimensions and contours of the profiled strip chosen in accordance with the invention can prevent the thin plastics material tube deforming beyond its elastic limit under internal pressure. The exact contour and dimensions of the profiled strip are chosen as described more fully hereinafter, but briefly for a plastics material tube of given wall thickness the strip is chosen so as to reduce the maximum radius of the unsupported portion of the plastics material tube wall below a desired level.

The hose of the invention preferably carries a further external reinforcement, such as braided wire, as is common with flexible helically convoluted hoses. The external braid helps prevent damage to the plastics material tube wall, prevents undue elongation of the hose under internal pressure and furthermore acts as a stress carrying member.

The construction of the invention makes possible a range of designs which overcome the disadvantages attendant on the previously known designs discussed above. The tube may be made of relatively thin material, full vacuum capability can be maintained, the tubes are readily and easily flexed and the degree of flexing can be set within the design parameters to maintain full pressure capability at any level of flexion.

The invention will be described further, by way of example, with reference to the accompanying drawings, in which:

FIG. 4 illustrates further sections of profiled strips; and

Figure 1:
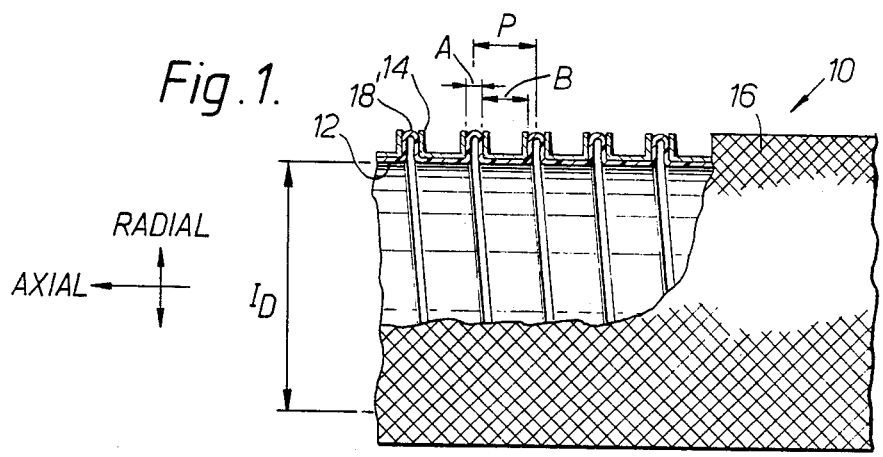
FIG. 1 is a diagramatic view, in half section, of a hose pipe in accordance with the invention.

Referring to the drawings, a hose pipe generally designated 10 comprises a thin walled helically convoluted plastics material tube 12 having a profiled strip 14 wound in its external convolutions. The hose is then covered with an external braid 16 as is known in the art.

Figure 2:
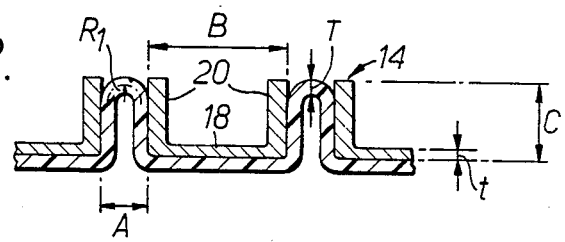
FIG. 2 is a detail of the profiled strip on an enlarged scale.

As can be seen more clearly from FIG. 2, the profiled strip 14 is channel shaped in section and has an axial component 18 and two radial components 20, which components in the neutral position (unflexed) of hose pipe 10 are in substantially coextensive contact with the wall of tube 12 along their corresponding coextensive portions. The directions "axial" and "radial" are with respect to the longitudinal axis of the hose pipe. The dimension A represents the spacing between adjacent profiled strips 14. As can be seen from FIG. 2 this is kept to a minimum and is considerably less than the dimension B the sum of the dimensions A and B of course being equal to the pitch P of the helix of the hose 10.

The thickness of the profiled strip is "t" and, while there is no necessity for the axial and radial components to be of the same thickness, this is preferred in practice since it eases manufacturing. The corresponding thickness of the plastics material is "T" and its radius of curvature at the peak of each convolution is $R_1$ in the unflexed position and $R_2$ in the position of maximum flexing (FIG. 3).

FIG. 4 illustrates some alternative contours for the profiled strip 14 which all retain the basic attributes of giving, by way of the axial component, support to the tube wall and, by way of the radial component, radial strength while being non-"solid". While a solid member could well give the necessary strength and support it would necessarily be more massive than the profiled strip of the invention and therefore would increase weight and cost, and lower flexibility of the hose. Sections 4(a) to 4(g) are 'open', i.e. do not overlap; while sections 4(h) to 4(k) are 'closed', i.e. they overlap to completely cover the convoluted tube. Section 4(c) illustrates a plastics material profile strip while sections 4(a), 4(b) and 4(d) to 4(k) illustrate metal profile strips.

The pressure resistance of the hose wall material varies inversely with radius of curvature of flexing. Thus the limiting condition for pressure resistance is the radius of curvature of the upper peaks of the outer convolutions at maximum flexion of the hose 10 (radius $R_2$ in FIG. 3). The maximum radius of flexion of the hose is determined by the initial spacing A and the longitudinal restraining action of the external braid when the inner convolutions are compressed to touch pitch. In FIG. 3 the external radius at maximum flexion is given as R3 and the internal radius as R4.

Figure 3:
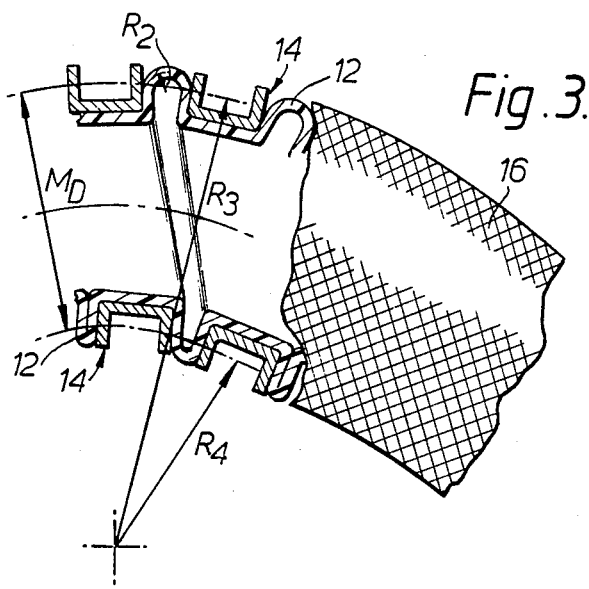
FIG. 3 is a similar view to FIG. 1 with the hose flexed.

In a particular example constructed in accordance with FIGS. 1 to 3 the hose 10 was made from a thin wall PTFE material of thickness 0.04 inches having an internal diameter of 2 inches. The pitch of the helix, P, was 0.535 inches and the spacing of the profiled strip 14 in the neutral position (unflexed) was A, equal to 0.16 inches. The width, B, of the profiled strip 14 was 0.375 inches and the height of the strip, C, 0.312 inches. The height of the peak 18' of the convolutions is somewhat less than the height of the strip C. The thickness of the profiled strip 14 was 0.037 inches.

An external braid 16 was applied of 48 bands of wire each consisting of 10 ends of stainless steel 0.018 inches diameter with neutral pitch on the hose of 8.6 inches. The profiled strip 14 was of stainless steel having a thickness, t, of 0.037 inches and a tensile strength of 40 tons per square inch. The radius of curvature of the tube 12 at the peak 18' (R1) was 0.06 inches.

The relationship between the pressure at yield ($P_y$) and radius is given below:

$$P_Y = \frac{0.77 \; TS}{R}$$

Where T is the thickness of the tube, S is the yield strength of the tube material, and R is the radius of curvature of the unsupported tube in axial direction.

In the present example R3 is 9 inches at the fully locked position which gives a radius of curvature on the exposed convolution at the now expanded outside convolution peak 18' (R2) of 0.105 inches. The yield strength of the PTFE was 1800 PSI and thus substituting into the equation gives:

$$P_Y = \frac{0.77 \times 0.04 \times 1800}{0.105}$$
$$= 528 \; p.s.i.$$

Thus this hose could be rated for a maximum pressure of approximately 500 p.s.i. and a minimum bend radius of 9 inches. The equivalent internal radius R4 of bend is approximately 6.5 inches.

Figure 5:
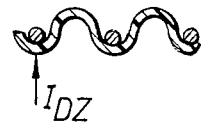
FIG. 5 is a similar view to FIG. 2 of a prior art standard round wire reinforced hose.

Surprisingly, this construction has also been found to provide the hose with remarkable resistance to crushing. The resistance to crushing with the hose of the example is 1.7 times that of the equivalent standard wire reinforced construction in accordance with UK Pat. No. 1,543,586 (FIG. 5) using the same basic tube material and thickness and with equal cross sectional area of round wire reinforcement and the same overall weight per unit length. Furthermore the latter hose has a maximum pressure strength at yield of 170 p.s.i.

Thus it can be seen that the hose of the invention exhibits remarkably improved pressure resistance with no increase in weight or loss of flexibility compared to conventional wire reinforced helically convoluted plastics material hose pipes.

While the invention has been described in relation to profiled strips which of a unitary nature, there is no reason why the strip should not be built up from two or more strips of simpler cross-sectional shape. However, for reasons of ease of manufacture and stability in use, it is preferred that a single unitary strip be employed.

I claim:

1. Flexible hose which comprises a flexible helically convoluted plastic material tube would helically on its exterior with a reinforcing profiled strip of non-circular cross section having an axial component extending substantially axially of the tube and a radial component extending substantially radially of the tube, such that in unflexed condition the axial and radial components are arranged in supporting contact with the tube wall along their corresponding coextensive portions and the axial spacing between adjacent helical windings of the strip is substantially smaller than the dimension of the axial component for providing a relatively minimized spacing between said windings and a relatively maximized axial component dimension consistent with maintaining hose flexibility so as to reduce the area of unsupported hose between said windings, the height of the peaks of the tube convolutions between said windings being less than the height of the corresponding radial component, whereby the axial and radial components support the tube wall and limit the maximum radius of curvature at maximum flexion of any portion of the tube wall to a value less than that which is obtained with an equivalent standard hose as constituted by a round wire reinforced helically convoluted hose of the same plastic material of the same thickness, with equal sectional area of round wire reinforcement, and the same overall weight per unit length.

2. Hose of claim 1 wherein the maximum radius of curvature is one half or less of that of said equivalent standard hose.

3. Hose of claim 1 wherein the radial component is sized and arranged to enhance resistance to radial forces by limiting the radius of curvature of the adjacent convolution, and to support the side walls of the convolution and impart mechanical strength in the radial direction to give internal pressure and external pressure resisting properties to the hose.

4. Hose of claim 3 wherein the strip has a generally channel section with the base of the channel forming the axial component and the side walls of the channel each forming a radial component.

5. Hose of claim 1 wherein the strip comprises a resilient plastic material or a metal.

6. Hose of claim 1 wherein the tube is made of a relatively rigid plastic material selected from polytetrafluoroethylene, polypropylene, polyamide, and plasticized polyvinylchloride or the like materials.

7. Hose of claim 1 carrying external reinforcement.

8. Hose of claim 1 carrying external reinforcement in the form of a braided wire.

9. Hose of claim 8 wherein the strip is of such a section that axially adjacent portions do not overlap.

10. Hose of claim 8 wherein the strip is of such a section that axially adjacent portions overlap to cover completely the convoluted tube.

11. Flexible hose which comprises a flexible helically convoluted plastic material tube wound helically on its exterior with a reinforcing profiled strip of non-circular cross section having an axial component extending substantially axially of the tube and a radial component extending substantially radially of the tube, such that in unflexed condition the axial and radial components are arranged in supporting contact with the tube wall along their corresponding coextensive portions and the axial spacing between adjacent helical windings of the strip is substantially smaller than the dimension of the axial component, the sum of said spacing and the dimension of the axial component constituting the normal pitch of the hose, for providing a pitch with a relatively minimized spacing between said windings and a relatively maximized axial component dimension consistent with maintaining hose flexibility so as to reduce the area of unsupported hose between said windings, the height of the peaks of the tube convolutions between said windings being less than the height of the corresponding radial component, and such radial component being sized and arranged to enhance resistance to radial forces by limiting the radius of curvature of the adjacent convolution, and to support the side walls of the convolution and impart mechanical strength in the radial direction to give internal pressure and external pressure resisting properties to the hose, whereby the axial and radial components support the tube wall and limit the maximum radius of curvature at maximum flexion of any portion of the tube wall in dependence upon said minimized spacing between said windings and the height of said tube convolution peaks.

12. Hose of claim 11 wherein the strip has a generally channel section with the base of the channel forming the axial component and the side walls of the channel each forming a radial component.

13. Flexible hose which comprises a flexible helically convoluted plastic material tube wound helically on its exterior with a reinforcing profiled strip of non-circular cross section having an axial component extending substantially axially of the tube and a radial component extending substantially radially of the tube, said cross section constituting a generally channel section with the base of the channel forming the axial component and the side walls of the channel each forming a radial component, such that in unflexed condition the axial and radial components are arranged in supporting contact with the tube wall along their corresponding coextensive portions and the axial spacing between adjacent helical windings of the strip is substantially smaller than the dimension of the axial component, the sum of said spacing and the dimension of the axial component constituting the normal pitch of the hose, for providing a pitch with a relatively minimized spacing between said windings and a relatively maximized axial component dimension consistent with maintaining hose flexibility so as to reduce the area of unsupported hose between said windings, the height of the peaks of the tube convolutions between said windings being less than the height of the corresponding radial component, and such radial component being sized and arranged to enhance resistance to radial forces by limiting the radius of curvature of the adjacent convolution, and to support the side walls of the convolution and impart mechanical strength in the radial direction to give internal pressure and external pressure resisting properties to the hose, whereby the axial and radial components support the tube wall and limit the maximum radius of curvature at maximum flexion of any portion of the tube wall in dependence upon said minimized spacing between said windings and the height of said tube convolution peaks,
  in combinatiion with an external reinforcement arranged, in conjunction with said minimized spacing, to limit the maximum radius of curvature by longitudinal restraining action of the external reinforcement when the hose convolutions are compressed to touch pitch during flexion.

* * * * *